(12) United States Patent
Brooks, III

(10) Patent No.: US 11,585,089 B2
(45) Date of Patent: Feb. 21, 2023

(54) LIGHTWEIGHT, WOOD-FREE STRUCTURAL INSULATION SHEATHING

(71) Applicant: John F. Brooks, III, Fairmount City, PA (US)

(72) Inventor: John F. Brooks, III, Fairmount City, PA (US)

( * ) Notice: Subject to any disclaimer, the term of this patent is extended or adjusted under 35 U.S.C. 154(b) by 0 days.

(21) Appl. No.: 17/076,679

(22) Filed: Oct. 21, 2020

(65) Prior Publication Data
US 2022/0136247 A1 May 5, 2022

Related U.S. Application Data

(60) Provisional application No. 62/924,125, filed on Oct. 21, 2019.

(51) Int. Cl.
| | |
|---|---|
| E04C 1/00 | (2006.01) |
| E04C 2/296 | (2006.01) |
| E04B 2/00 | (2006.01) |
| B32B 7/12 | (2006.01) |
| B32B 5/26 | (2006.01) |

(52) U.S. Cl.
CPC .............. *E04C 2/296* (2013.01); *B32B 5/266* (2021.05); *B32B 7/12* (2013.01); *E04C 2/46* (2013.01); *B32B 2255/02* (2013.01); *B32B 2255/102* (2013.01); *B32B 2262/101* (2013.01); *B32B 2266/0228* (2013.01); *B32B 2307/102* (2013.01); *B32B 2307/304* (2013.01); *B32B 2307/724* (2013.01); *B32B 2307/732* (2013.01); *B32B 2419/06* (2013.01); *B32B 2607/00* (2013.01)

(58) Field of Classification Search
CPC ................................. E04C 2/296; B32B 5/266
See application file for complete search history.

(56) References Cited

U.S. PATENT DOCUMENTS

| | | | | |
|---|---|---|---|---|
| 2008/0127587 | A1* | 6/2008 | McIntire | E04D 1/08 52/309.12 |
| 2011/0268916 | A1* | 11/2011 | Pardue, Jr. | B32B 3/12 428/688 |
| 2011/0300386 | A1* | 12/2011 | Pardue, Jr. | B32B 13/12 428/688 |
| 2013/0074432 | A1* | 3/2013 | Ciuperca | E04B 1/161 52/309.4 |
| 2014/0272404 | A1* | 9/2014 | Shake | B32B 13/12 428/221 |
| 2016/0273221 | A1* | 9/2016 | Ciuperca | E04B 2/56 |
| 2016/0361894 | A1* | 12/2016 | Ciuperca | E04B 1/625 |
| 2018/0171641 | A1* | 6/2018 | Serino | E04F 13/0862 |
| 2019/0119439 | A1* | 4/2019 | Queen | C08J 9/32 |

* cited by examiner

*Primary Examiner* — Basil S Katcheves
(74) *Attorney, Agent, or Firm* — Gary P. Topolosky

(57) ABSTRACT

A structural insulation sheathing (SIS) comprises: a first upper facial member, a second lower facial member and an insulation member in intimate, planar contact with both the first upper member and second lower members. The first and second facial members are made from the same reinforcing fiber material less than about 3/16 inch thick. The insulation member comprises a foam layer, said structural insulation sheathing having at least 10×, preferably 15 to 20 times greater strength than its individual components.

17 Claims, 5 Drawing Sheets

LIGHTWEIGHT, WOOD-FREE STRUCTURAL INSULATION SHEATHING

CROSS-REFERENCE TO RELATED APPLICATION

This application is a perfection of U.S. Provisional Application Ser. No. 62/924,125, filed on Oct. 21, 2019, the disclosure of which is fully incorporated by reference herein.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

(1) Field of the Invention

This invention relates to the field of structural insulation sheathing (or SIS). More particularly, it relates to a new and improved sheathing panel that is substantially stronger than its component parts. When layered and adhered together per the present invention, it achieves strength levels at least ten times, more like twenty times, stronger than its central core strength alone.

The residential construction market has structural sheathing (SS) products that offer no significant insulation value such as oriented strand board (OSB), plywood, fiberboard, and multi-layer pressure-laminated fibrous paperboard. The residential construction market also has insulated sheathing (IS) products that offer only limited structural properties such as expanded polystyrene (EPS), extruded polystyrene (XPS) and polyisocyanurate foam (PIR). These aforementioned sheathing products are typically in panel form.

In one aspect, this invention relates to structural insulation sheathing (SIS) and methods for manufacturing the same. Another aspect of the invention relates to an SIS panel comprising two facial members for sandwiching an insulation member. In yet another aspect, the invention relates to a building wall comprising these new SIS panels.

One embodiment of the present invention is structural insulation sheathing, preferably in the form of a panel, which comprises two outer or "facial" members that surround or sandwich an intermediate, insulation member. The two facial and intermediate insulation members are in intimate, planar contact with one another. Preferably, the two facial members are adhered directly to the insulation member. Alone, these elements do not provide sufficient structural strength—the outer layers will bend or break (crack) with the application of nominal pressure; and the central core/intermediate layer standing alone (IM only) cannot withstand the application of a 20 lb. weight (Wt) when comparably sized and placed between sawhorses as per accompanying FIG. 6.

(2) Description of Related Art Including Information Disclosed Under 37 CFR 1.97 and 1.98

This invention distinguishes over the following prior art arranged chronologically:

U.S. Pat. Nos. 6,941,720, 8,215,083, 8,925,269, 9,546,479, 9,574,341, 9,624,666, 9,702,152, 9,809,981, 9,925,753, 9.957.715, 10,179,997, 10,221,563, 10,316,515, 10,385,566 and 10,415,245;

Published U.S. Application Nos. 20010001218, 20020017222, 20040137813, 20060260267, 20090098357, 20090113831, 20100297424, 20110268916, 20110300386, 20120291384, 20130283713, 20140272404, 20160273221, 20160361892, 20170363134, 20170368785, 20180016781, 20180038101 and 20190119439; as well as WO1999029978 and EP2364841.

BRIEF SUMMARY OF THE INVENTION

A structural insulation sheathing (SIS) comprises: a first upper facial (or facing) member, a second lower facial/facing member and an insulation member in intimate, planar contact with both the first upper member and second lower members. Preferably, the first and second facial members are made from the same reinforcing fiber material less than about 3/16 inch thick. The insulation member comprises a foam layer, said structural insulation sheathing having at least 10×, maybe 15 to 20 times or more, the strength of its individual components. A building wall made from a plurality of such structural insulation sheathing (SIS) panels is disclosed as is a related method of manufacturing such panels.

BRIEF DESCRIPTION OF THE SEVERAL VIEWS OF THE DRAWING(S)

Further features, objectives and advantages will become clearer with the following description of Preferred Embodiments made with reference to the accompanying photographs in which:

FIG. 1 is a front plan view showing the three main layers, $FL_1$, IM and $FL_2$, to one embodiment of this invention, joined together with adhesive layers $A_1$ and $A_2$, for making into one composite panel "SIS". Note how both $FL_1$ and $FL_2$ consist of both upper layers UL and lower layers LL. Preferred respective thicknesses for the various sub-layers are indicated by "t" designations, more particularly $t_{FL1}$, $t_{IM}$ and $t_{FL2}$, as quantified in more detail herein;

Figure 1:
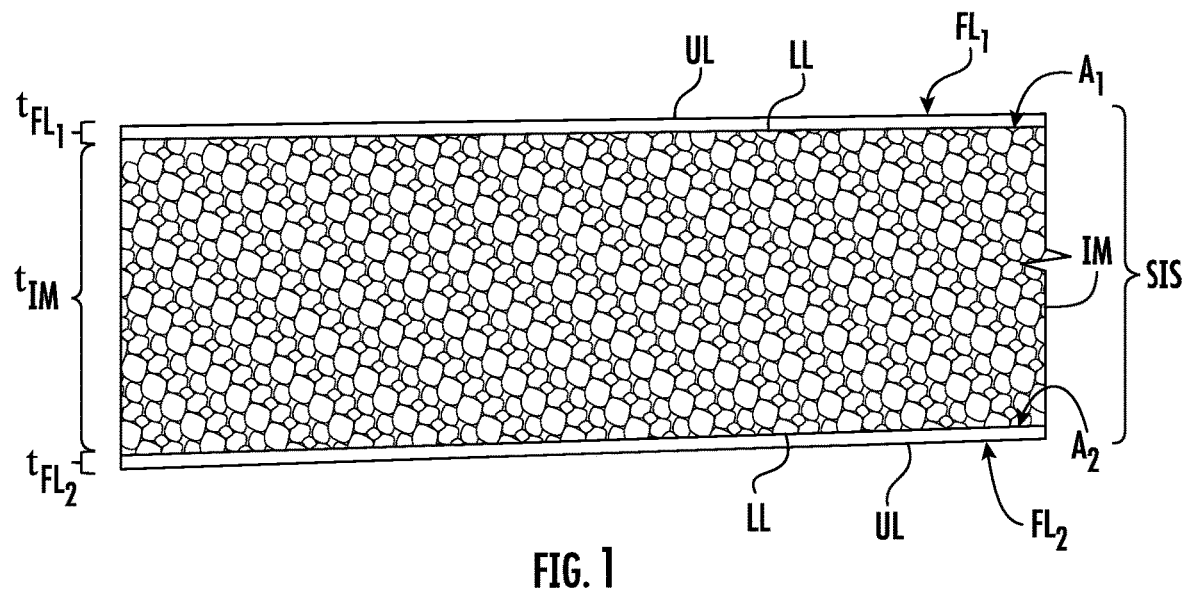
Figure 2:
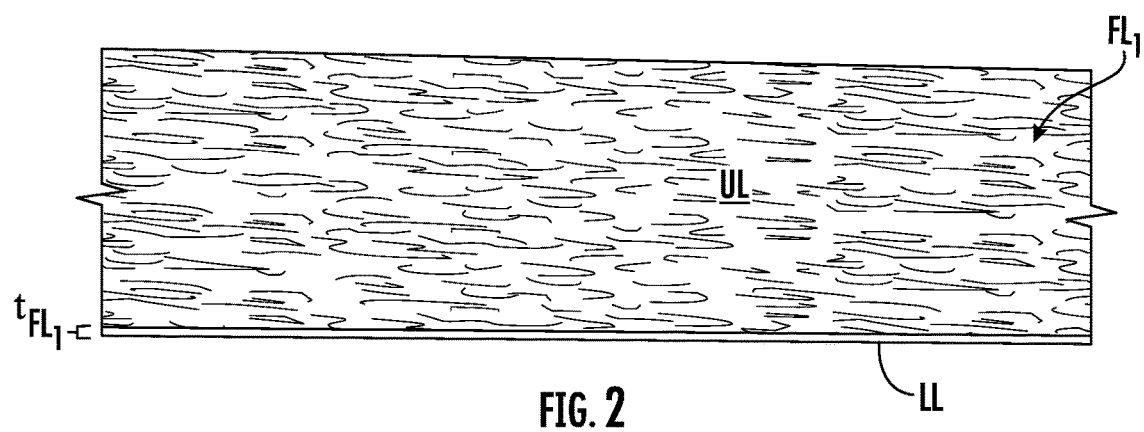
FIG. 2 is a top perspective view showing one embodiment of thin, fibrous facing layer for use with the preferred embodiment shown in FIG. 1, this version having an upper facing layer and a lower facing layer.
Figure 3:
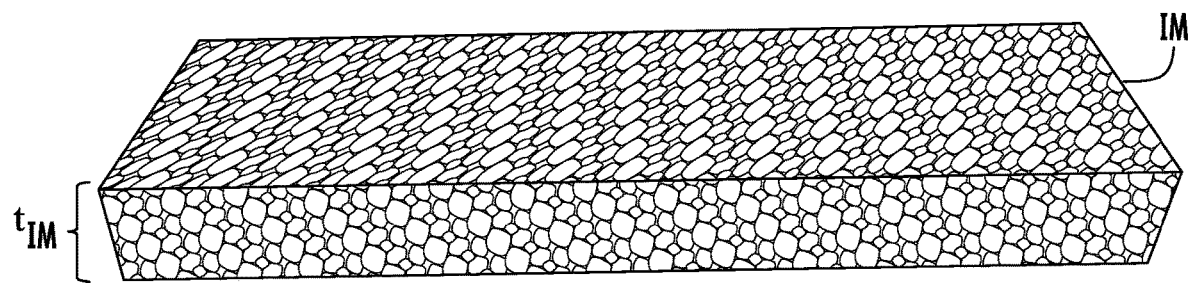
FIG. 3 is a top perspective view showing one embodiment of intermediate core layer per one embodiment of this invention, said core layer to be surrounded with thin fibrous facing layers atop and below.
Figure 4:
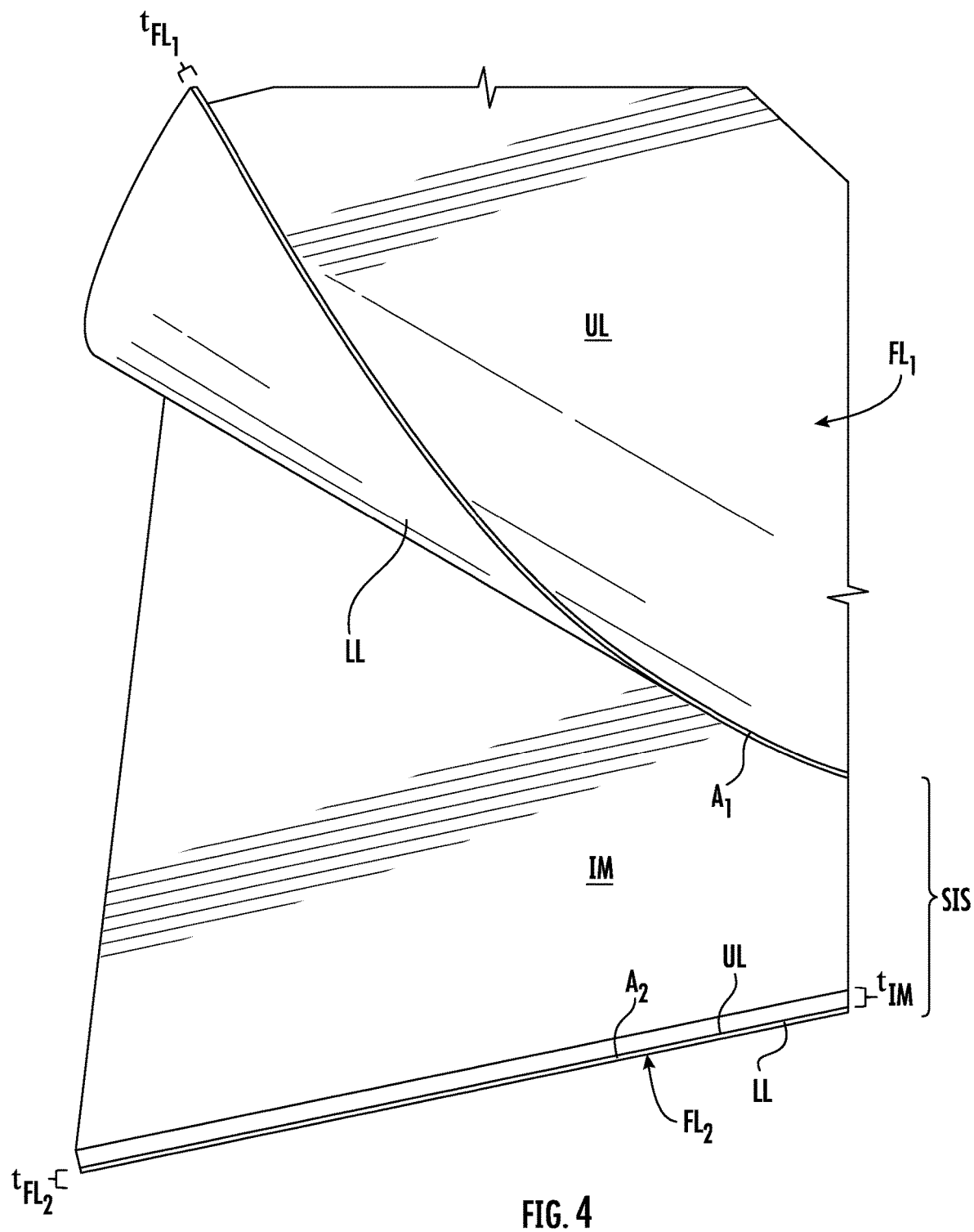
FIG. 4 is a top perspective view showing a top facing layer being positioned over this invention's central core layer for eventual adhesion thereto.
Figure 5:
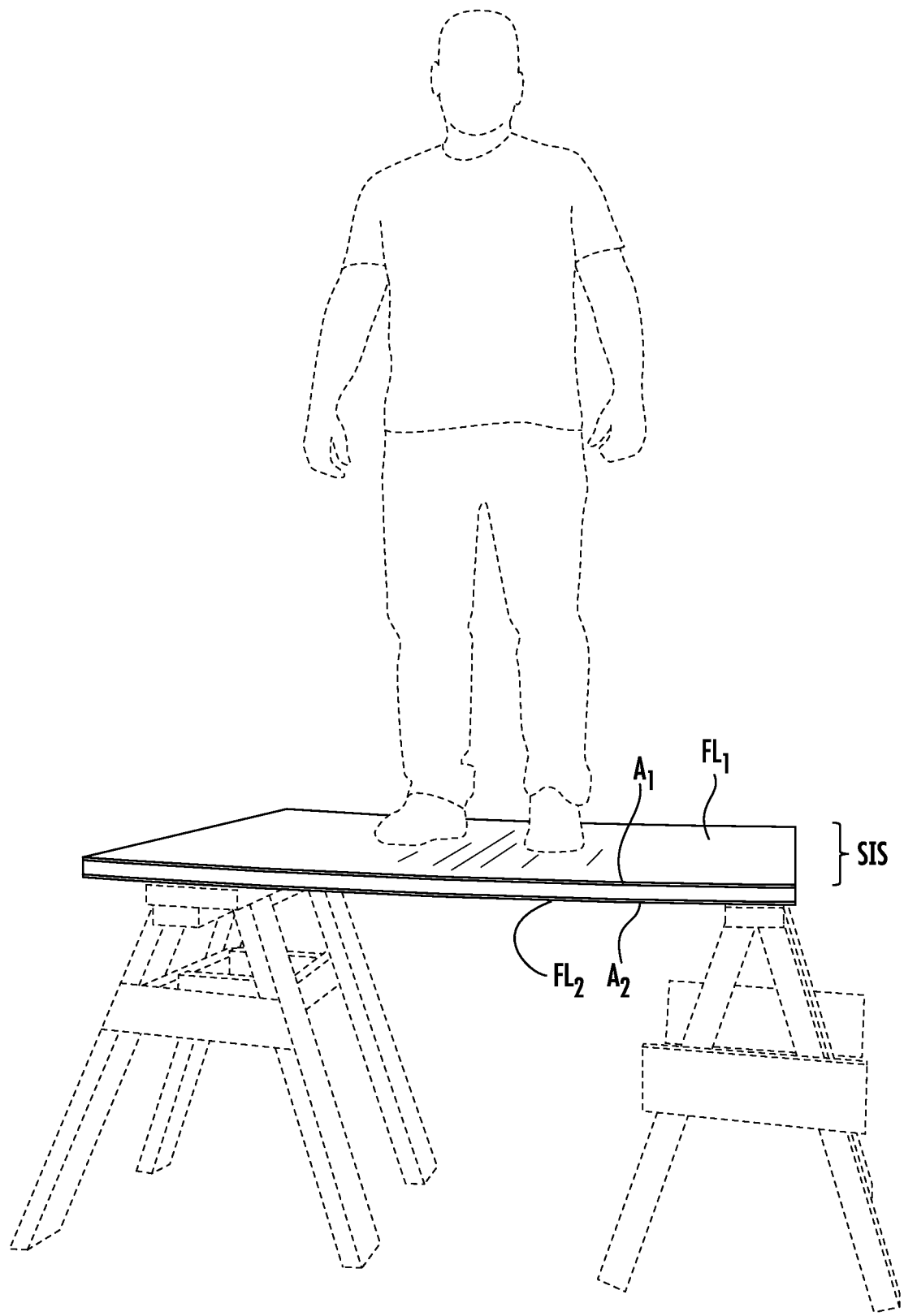
Figure 6:
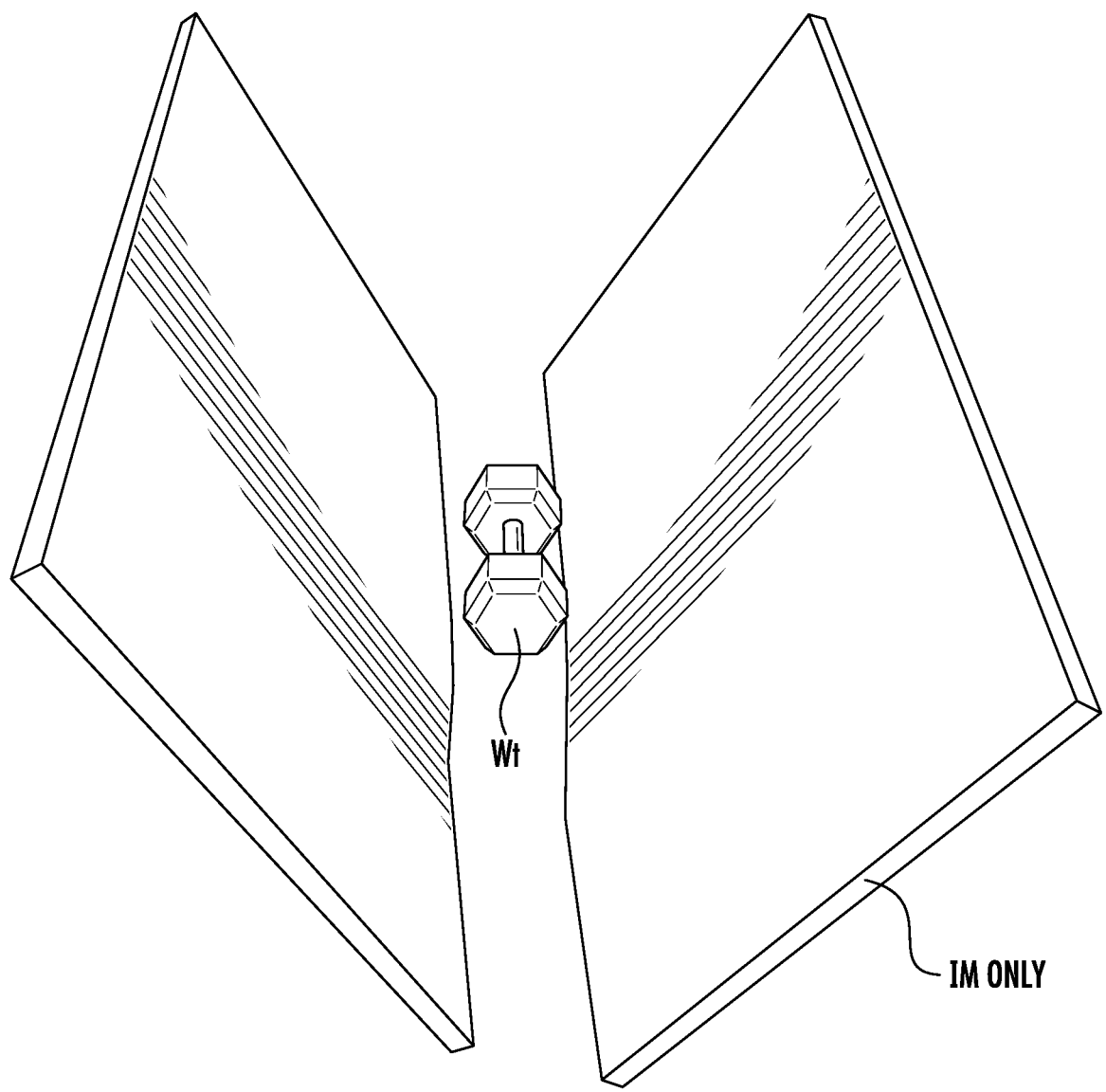

FIG. 5 is a lower perspective view showing the inventor (weighing approximately 220 lbs.) standing on a section of SIS panel made per the present invention and situated over two sawhorses for illustrating the strength levels achieved hereby; and FIG. 6 is a top perspective view showing a section of just the central core material (marked "IM only") that was split apart when a mere 20 lb. weight (item Wt) was situated thereon.

DETAILED DESCRIPTION OF THE INVENTION

Extremely lightweight structural insulation sheathing (SIS), preferably in the form of a panel, comprises all nonstructural layers with an insulation core to form a structural panel. This panel uses no wood products that are prone to rot and it contains no materials that would be a food source for mold and/or mildew.

The SIS construction would be a first facial layer, a core layer, then another facial layer. The facing layers, $FL_1$ and $FL_2$, are preferably less than 3/16" thick, more preferably around 1/16" thick each and may contain a plurality of reinforcing fibers therein. Such fibers can be made from ceramic, glass, natural material such as hemp, carbon, mineral wool, and/or polymers among other possibilities. The insulation core IM can be varied in thickness to achieve the desired R-value for the panel assembly as a whole.

The preferred assembly may also include an added $4^{th}$ layer to one of the two outside face layers. That fourth layer would be a weather resistant barrier (or WRB).

The three main layers to this invention are non-structural on their own. But, once they are duly combined to each other (as a pseudo-sandwich), the combination achieves incredible strength levels.

This new and improved SIS panel would take the place of plywood or OSB in a wall assembly while still also insulating the wall. In one embodiment, the two outside "facing" layers are currently made from a fiberglass and polypropylene blend to form a sheet that is vapor open. The inside or central core layer would be insulation, preferably an EPS (expanded polystyrene) product or GPS (graphite polystyrene) product when making a vapor permeable panel. Alternately, consider using phenolic insulation, extruded polystryrene (or XPS), polyisocyanurate ("polyiso") or polyurethane in this "sandwich" when making a vapor-closed panel.

For the method of making such panels, the EPS or GPS would be laminated to both facing layers, one above and one below, with one or more vapor permeable glues. The polyiso or polyurethane panels could be foamed in place between the facers using the foam insulation as a binder to combine all three layers together into one super-strong panel.

It is believed that the SIS panel of this invention achieves its strength by keeping the facers equally distant from one another with a substantially continuous adhesion of the core to both facers. The SIS panel would be made in different thicknesses for different desired insulation performance levels (the higher the R-value desired, the thicker the central core layer needs to be).

This new, wood-free SIS would be used over a studded wall like a sheet of OSB or plywood for giving that wall the strength that OSB or plywood or OSB would give to that wall while further providing insulation value. This new panel will have a high R-value, helping builders meet the new energy codes with fewer materials while providing a major labor savings and using fewer products at the jobsite.

When including an optional layer of WRB to the system, this new panel would save two trips by installers around a new building construction while also bringing great building science with it. The assembly can be manufactured to be vapor permeable or vapor closed depending on the climate that it will be used in. The panels should also have a low acoustic transmission and high acoustic absorption qualities. While primarily designed for wall applications, it could also be used in floors, ceilings, and roofs by increasing the density or the strength of the central foam core layer.

In one embodiment, the central insulation member of this invention comprises a foamed composition that have been formed by dispensing as liquids, sprays or froths of a foamable composition onto the surface of one (or both) facial members. Such compositions preferably comprise polyurethane or polyisocyanurate foams. Depending on the foaming materials selected, these foams may be rigid, semi-rigid or (less preferred) not rigid at all.

The thickness of the insulation member can be anything sufficient to meet the insulation requirements of the application for which it will be used (for example, typical insulation thicknesses that are common in the marketplace and that would be useful within the present invention include 0.25 inches, 1.0, 2.0 or more inches). Preferably, for purposes of meeting the current demands of the North American residential market, the thickness of the central insulation member, $t_{IM}$, should be a complement to the thickness of the two outer facial layer thicknesses, $t_{FL1}$ and $t_{FL2}$, such that the overall thickness of the product, or SIS, is within the range of about 7/16 and 9/16 inches.

In another embodiment, the invention is a method for making a lightweight, wood-free SIS panel comprising the steps of: a) feeding a first sheet of facial member to a continuous foaming line; b) dispensing liquids, sprays or froths of a foamable composition onto the surface of the facial member; c) allowing the foamable composition to expand and cure; then d) feeding a sheet of structural member to be expanded and cured BETWEEN first two facial layers.

Useful adhesives ($A_1$, $A_2$) for bonding multiple layers include, but are not necessarily limited to, water-based materials such as latex emulsions and dispersions, soluble silicates, phosphate cements, animal-based glues, starch cellulosics, mucilages, and similar, and synthetic materials such as silicates, urethanes, acrylics, polychloroprenes, hot melt, polyurethanes, etc. The adhesive layers alternatively may comprise hydrocarbon resins, rubber latex compounds, elastomer-solvent cements, thermoplastic resins, thermosetting resins, and similar. A water resistant adhesive is preferred.

The individual thicknesses of adhesive layers may vary over wide limits from about 0.001 inch to about 0.01 inch, and the adhesive layers may be the same or different.

Still other variations of this improved SIS may further include one or more optional additives such as pigment, anti-oxidant, flame retardants, processing aids, and slow release adhesives for promoting adhesion to the construction stud after nailing or other mechanical fastening, etc.

The SIS composite structure can be of any size and shape, and conventional sheathing sizes are typically preferred (for example, four foot by eight, nine or even ten foot length panels). Known adhesives or standard nailing (or staple or screw) patterns are used to attach the SIS composite structure to the wall studs.

What follows are several critical things that set this product apart from other laminated panels in the market today:

Common SIS panels take a structural panel, typically a wood fiber panel, and laminate or foam an insulation sheet to it. These systems are incredibly heavy and typically have issues with leveraging the weight of the structural panel away from the wall causing the panel to shift over time, even bending the nails that attach the SIS panel because there is little strength at the framing members. These wood SIS panels usually have the wood substrate outside the dew point of a wall. That arrangement causes condensation issues leading to mold, mildew and rot. The lightweight panels of this invention, by contrast, do not have any wood in them and keep the dew point in the insulation where is cannot cause condensation damage. The two fiber reinforced facers keep the panel from moving on the wall under the load of heavy cladding such as fiber cement. This makes the panel strong and tear resistant especially at: the attachment point of the wall and along the outside surface for heavy claddings such as fiber cement sidings.

No components used to make this product are considered "structural" on their own; but once they are combined altogether, they become incredibly strong.

There is no wood in this product to mildew, rot, or decay.

In the preferred version, it is vapor permeable for letting a wall assembly dry in both directions.

Very lightweight, a 1" thick by 4' by 8' panel weighs 1 lb.1 oz. versus a 1" thick panel of ZIP R-sheathing that weighs 59 lbs.

Has a facer skin layer on both sides adding great strength to the panel. The skin layer on the inside or stud side keeps the panel from being pulled down the wall as gravity takes over (a failure point with Zip R-sheathing). The skin on the outside keeps the nail that attaches the cladding to the wall from bending under the load of heavy sidings like metal and fiber cement.

The Atlas Thermal Star one panel system, with the structural panel to the inside against the framing and the insulation to the outside, destroys the WRB when driving nails to attach it. And, there is no way to inspect it for seeing whether the nail has the proper penetration.

The sheathing system (Huber Zip-R) with the insulation to the inside does not qualify for a structural sheathing in the thicker products as there is NO support on the inside surface of those panels.

Although the invention has been described in considerable detail, this detail is for the purpose of illustration. Many variations and modifications can be made on the invention as described above without departing from the spirit and scope of the invention as described in the appended claims.

SEQUENCE LISTING

Not applicable.

What is claimed is:

1. A structural insulation sheathing (SIS), said structural insulation sheathing (SIS) providing a structural strength for a building wall equivalent to OSB or plywood without need for using OSB, plywood or metal rods, said structural insulation sheathing (SIS) comprising: a rigid or semi-rigid first upper facial member, a rigid or semi-rigid second lower facial member, said first upper and second lower structural members being equally spaced from each other, and a central insulation member in intimate, planar contact with the first upper and second lower facial members, wherein the first and second facial members are made from a reinforcing fiber material less than 3/16 inch thick, said reinforcing fiber material being selected from the group consisting of: ceramic, glass, hemp, carbon, mineral wool, and a polymer, and the central insulation member comprises a foam layer selected from the group consisting of an EPS (expanded polystyrene), a GPS (graphite polystyrene), a polyisocyanurate and a polyurethane, said structural insulation sheathing having at least 10 times the strength of its individual components, i.e., the first upper facial member, the second lower facial member and the central insulation member if not combined to form the structural insulation sheathing (SIS).

2. The structural insulation sheathing (SIS) of claim 1 wherein the first upper and second lower facial members are 1/16 inch thick.

3. The structural insulation sheathing (SIS) of claim 1 wherein the first upper and second lower facial members are adhesively secured to the insulation member.

4. The structural insulation sheathing (SIS) of claim 1 wherein the first upper and second lower facial members are laminated to opposite sides of the insulation member.

5. The structural insulation sheathing (SIS) of claim 1 wherein the combined thickness of the first upper and second lower facial members and the central insulation member is between 7/16 and 9/16 inch.

6. The structural insulation sheathing (SIS) of claim 1 wherein the thickness of the central insulation member determines an R-value for the structural insulation sheathing (SIS).

7. The structural insulation sheathing (SIS) of claim 1, which is made into a building panel at least 4 feet wide.

8. The structural insulation sheathing (SIS) of claim 7, which is made into a building panel at least 8 feet long.

9. The structural insulation sheathing (SIS) of claim 1, which further includes a weather resistant barrier (WRB) layer on at least one side.

10. The structural insulation sheathing (SIS) of claim 1 wherein the first upper and second lower members are made from a fiberglass and polypropylene blend to form a panel product that is vapor open.

11. The structural insulation sheathing (SIS) of claim 1 wherein the insulation member is made from an EPS (expanded polystyrene) or GPS (graphite polystyrene) for making a vapor permeable panel product.

12. The structural insulation sheathing (SIS) of claim 1 wherein the insulation member is made from a polyisocyanurate or polyurethane for making a vapor closed panel product.

13. A building wall comprising at least two of the structural insulation sheathing (SIS) of claim 1 placed adjacent to each other and sealed together with a weather resistant sealing material.

14. A method for making a structural insulation sheathing (SIS) panel, said structural insulation sheeting (SIS) panel providing a structural strength for a building wall equivalent to OSB or plywood without need for using OSB, plywood or metal rods, said method comprising the steps of: a) feeding a first sheet of rigid or semi-rigid facial member selected from the group consisting of: ceramic, glass, hemp, carbon, mineral wool, and a polymer, to a continuous foaming line; b) dispensing a foamable composition selected from the group consisting of an EPS (expanded polystyrene), a GPS (graphite polystyrene), a polyisocyanurate and a polyurethane onto the surface of the first sheet of facial member; c) allowing the foamable composition to expand and cure into a laminated sheet panel and d) feeding a second sheet of rigid or semi-rigid facial member selected from the group consisting of: ceramic, glass, hemp, carbon, mineral wool, and a polymer for adhering to the laminated sheet panel on a side opposite the side with the first sheet of facial member, said first facial member and second facial member being equally spaced from each other.

15. The method of claim 14 wherein the first sheet of facial member and the second sheet of facial member are each less than 3/16 inch thick.

16. The method of claim 14 wherein the thickness of the laminated sheet panel determines an R-value.

17. The method of claim 14 which further includes: adding a weather resistant barrier (WRB) layer to one side of the laminated sheet panel.

\* \* \* \* \*